United States Patent
Perrault et al.

(10) Patent No.: US 8,066,258 B2
(45) Date of Patent: Nov. 29, 2011

(54) VALVE SEAT APPARATUS FOR USE WITH FLUID VALVES

(75) Inventors: Aaron Andrew Perrault, Burnsville, MN (US); Rochelle Marie Blackford, Marshalltown, IA (US); David James Westwater, Marshalltown, IA (US); Ronald W. Kaufmann, La Porte City, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 219 days.

(21) Appl. No.: 12/472,102

(22) Filed: May 26, 2009

(65) Prior Publication Data
US 2010/0301253 A1 Dec. 2, 2010

(51) Int. Cl.
*F16K 1/00* (2006.01)
(52) U.S. Cl. ... 251/334; 251/333; 251/359; 137/625.28; 137/625.38
(58) Field of Classification Search ........ 251/325, 251/333, 334, 359, 360, 361; 137/625.28, 137/625.37, 625.38
See application file for complete search history.

(56) References Cited

U.S. PATENT DOCUMENTS

| | | | |
|---|---|---|---|
| 2,530,433 A | 11/1950 | Jaegle | |
| 3,772,860 A * | 11/1973 | Weiberg | 56/13.5 |
| 4,302,020 A | 11/1981 | Morales | |
| 6,772,993 B1 * | 8/2004 | Miller et al. | 251/363 |
| 7,373,951 B2 | 5/2008 | Gossett et al. | |
| 7,448,409 B2 | 11/2008 | Micheel et al. | |
| 2003/0159737 A1 | 8/2003 | Stares | |
| 2006/0048826 A1 | 3/2006 | Gossett et al. | |
| 2009/0057595 A1 | 3/2009 | Micheel et al. | |

FOREIGN PATENT DOCUMENTS

| | | |
|---|---|---|
| EP | 0529928 | 3/1993 |
| EP | 0602519 | 6/1994 |

OTHER PUBLICATIONS

International Searching Authority, "International Search Report," issued in connection with international application serial No. PCT/US2010/031449, mailed Aug. 5, 2010, 5 pages.

International Searching Authority, "Written Opinion of the International Searching Authority," issued in connection with international application serial No. PCT/US2010/031449, mailed Aug. 5, 2010, 6 pages.

* cited by examiner

*Primary Examiner* — John Fristoe, Jr.
(74) *Attorney, Agent, or Firm* — Hanley, Flight & Zimmerman, LLC (57) ABSTRACT

A valve seat apparatus for use with fluid valves is described. An example valve seat apparatus includes a flexible seal disposed between a cage and a valve body such that an outer seating surface of a closure member slidably coupled to the cage slidingly engages the flexible seal to prevent fluid flow through the valve body when the valve is in a closed position and an end of the closure member is not driven into abutting engagement with another seating surface when the valve is in the closed position.

20 Claims, 7 Drawing Sheets

VALVE SEAT APPARATUS FOR USE WITH FLUID VALVES

FIELD OF THE DISCLOSURE

This disclosure relates generally to valves and, more particularly, to a valve seat apparatus for use with fluid valves.

BACKGROUND

Valves are commonly used in process control systems to control the flow of process fluids. Sliding stem valves (e.g., a gate valve, a globe valve, a diaphragm valve, a pinch valve, etc.) typically employ a closure member (e.g., a valve plug) disposed in a fluid path to control the fluid flow through the valve. Typically, the closure member is configured to engage a valve seat (e.g., a seat ring) disposed in the flow path through the valve. A valve stem operatively couples the closure member to an actuator that moves the closure member between an open position and a closed position to allow or restrict fluid flow between an inlet and an outlet of the valve. In operation, the control member may be moved toward and/or moved away from the valve seat via the actuator to control the flow of fluid through the valve.

To provide a tight shut-off or a seal, the closure member typically engages and aligns with the valve seat when the valve is in the closed position. Thus, any misalignment between these components may cause undesired leakage. Variations in the structure or dimensions of the components arising from, for example, an imprecise manufacturing process may cause such misalignments. Thus, during manufacturing, a closure member and/or a valve seat is typically formed in accordance with precise (e.g., tight) tolerances or a high degree of dimension control, thereby significantly increasing manufacturing complexity and costs.

SUMMARY

An example valve seat apparatus for use with valves includes a flexible seal disposed between a cage and a valve body such that an outer seating surface of a closure member slidably coupled to the cage slidingly engages the flexible seal to prevent fluid flow through the valve body when the valve is in a closed position. An end of the closure member is not driven into abutting engagement with another seating surface when the valve is in the closed position.

In another example, a fluid valve includes a valve body defining a fluid flow passageway between an inlet and an outlet and having at least one stepped surface adjacent an orifice of the fluid valve. A cage has a first opening to slidably receive at least a portion of a closure member of the fluid valve and a second opening to control the flow characteristics of fluid through the fluid valve. A valve seat is disposed between an end of the cage and a stepped portion of the valve body adjacent the orifice. An outer seating surface of the closure member slidingly engages the valve seat when the closure member is in the closed position to prevent fluid flow between the inlet and the outlet of the valve. Additionally, the closure member is not driven into engagement with another seating surface when the valve is in the closed position.

In yet another example, a valve seat apparatus for use with fluid valves includes means for sealing an orifice of a fluid valve. The means for sealing is captured between an end of a guide structure and a stepped surface of a valve body. An outer surface of a closure member slidingly engages the means for sealing to prevent fluid flow through the orifice of the valve when the valve is in a closed position and the closure member is not driven into abutting engagement with another seating surface when the valve is in the closed position.

DETAILED DESCRIPTION

The example valve seat apparatus described herein may be used with fluid valves having a sliding stem such as, for example, control valves, throttling valves, etc., which may include a valve trim arrangement (e.g., a cage). In general, the example valve seat apparatus described herein may be used to effect a seal or tight shut-off between a closure member and a valve body when the valve is in a closed position or condition. For example, the closure member slidably and/or sealingly engages the valve seat apparatus to substantially prevent leakage between an inlet and an outlet of a valve when the valve is in the closed position. Additionally, the closure member is not driven into abutting engagement with another seating surface (e.g., a conventional seat ring coupled to the valve body) when the valve is in the closed position.

In particular, an example valve seat apparatus described herein includes a first seal disposed or fixed between a surface of the valve body and a guide structure such as, for example, a cage. The closure member moves between an open position at which the closure member is spaced away from the valve seat to allow fluid flow through the valve, and a closed position at which the closure member sealingly engages the valve seat to prevent fluid flow through the valve. More specifically, the valve seat apparatus may include a flexible C-seal or any other suitable seal(s). A fluid valve implemented with the example valve seat apparatus described herein may be formed in accordance with relaxed manufacturing tolerances and/or reduced parts or components (e.g., a conventional seat ring may be eliminated), thereby significantly reducing the complexity and cost of the valve.

Additionally, the example valve seat apparatus described herein may be replaced and/or repaired during maintenance with more ease as compared to a conventional seat ring. Also, because the example valve seat apparatus described herein engage a side or body surface of a closure member when the closure member is in the closed position, the closure member may be held or maintained in the closed position using substantially less force or seat load (e.g., provided by an actuator). As a result, a fluid valve using the example seat apparatus described herein may be controlled with a relatively smaller actuator, thereby further reducing costs. The example valve seat apparatus described herein are also flexible to allow for thermal expansion of a guide structure (e.g., a cage) relative to a valve body without substantially affecting the performance (e.g., sealing performance) of the valve seat apparatus.

Figure 1:
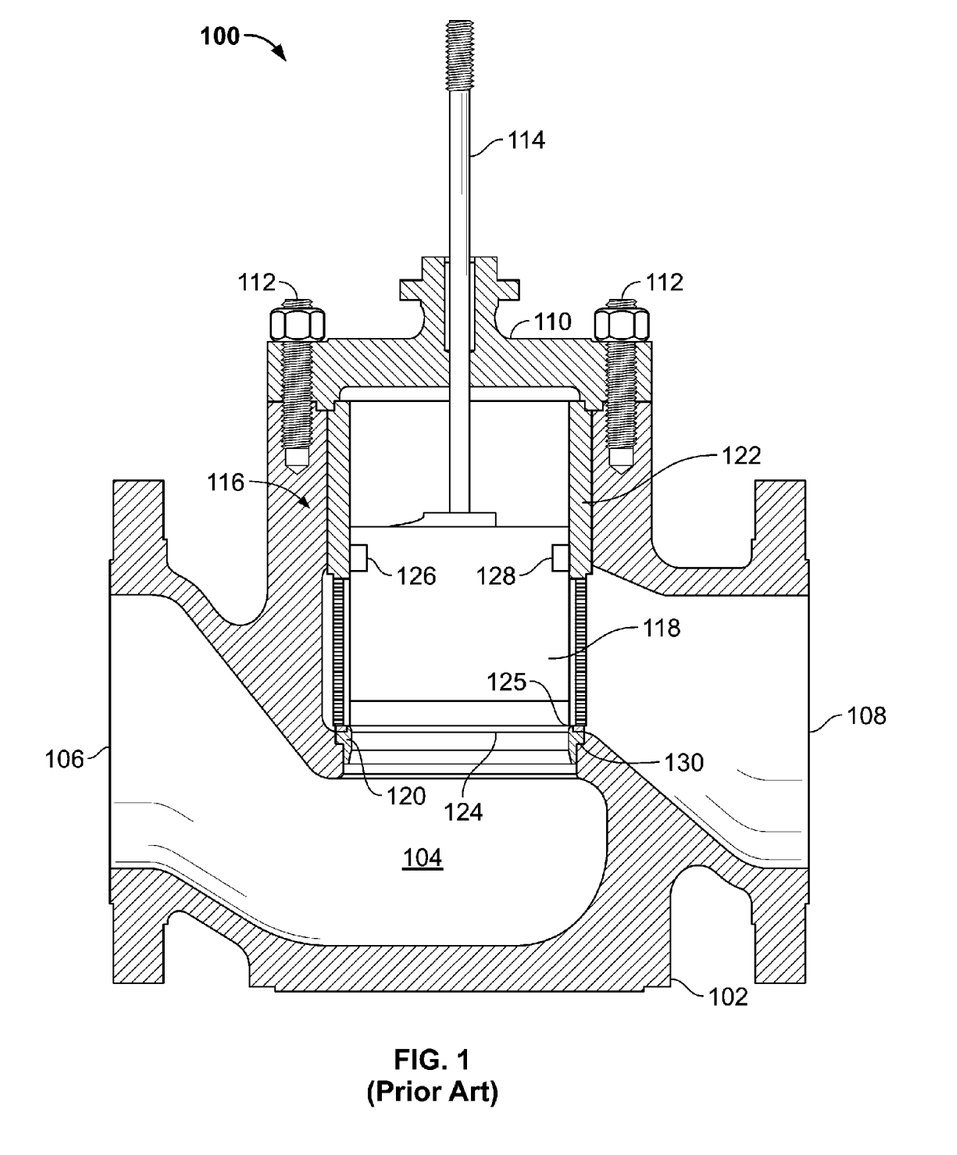
FIG. 1 illustrates a portion of a known fluid valve having a known valve seat.

FIG. 1 illustrates a cross-sectional view of a portion of a known fluid valve 100. As shown in FIG. 1, the valve 100 includes a valve body 102 that defines a fluid flow passageway 104 between an inlet 106 and an outlet 108. A bonnet 110 is coupled to the valve body 102 via fasteners 112 and couples the valve body 102 to an actuator (not shown). Although not shown, the bonnet 110 may house a packing system (e.g., a spring packing) to prevent fluid leakage to the environment along a valve stem 114. A valve trim assembly 116 is disposed within the fluid flow passageway 104 formed in the valve body 102 to control the flow of fluid between the inlet 106 and the outlet 108. The valve trim assembly 116 includes internal components of the valve 100 such as, for example, a closure member 118, a valve seat 120 depicted as a seat ring, a cage 122, and the valve stem 114.

The valve seat 120 is disposed within (e.g., coupled to) the valve body 102 to define an orifice 124 through the fluid flow passageway 104 between the inlet 106 and the outlet 108. Although not shown, the valve seat 120 includes a gasket that provides a seal between the closure member 118 and the valve body 102 when the closure member 118 sealingly engages or contacts the valve seat 120. The cage 122 slidably receives the closure member 118 and is disposed between the inlet 106 and the outlet 108 to impart certain flow characteristics to the fluid flowing through the valve 100 (e.g., to reduce noise, reduce cavitation, etc.). The closure member 118 is operatively coupled to the valve stem 114 and moves in a first direction (e.g., away from the valve seat 120) to allow fluid flow between the inlet 106 and the outlet 108 and a second direction (e.g., toward the valve seat 120) to restrict or prevent fluid flow between the inlet 106 and the outlet 108. Thus, the flow rate permitted through the valve 100 is controlled by the position of the closure member 118 relative to the valve seat 120.

In operation, the actuator moves the closure member 118 via the valve stem 114 away from the valve seat 120 to allow fluid flow through the valve 100 (e.g., the open position) and toward the valve seat 120 to restrict fluid flow through the valve 100. An end 125 of the closure member 118 sealingly and abuttingly engages the valve seat 120 to prevent fluid flow through the valve 100 when the valve 100 is in the closed position. As depicted, a seal assembly 126 is disposed within a gland 128 of the closure member 118 and prevents fluid leakage between the closure member 118 and the cage 122 when the valve 100 is in the closed position (i.e., when the closure member 118 sealingly engages the valve seat 120) as shown in FIG. 1. Additionally, in the closed position, an actuator coupled to the stem 114 applies a force or load (e.g., a seat load) to hold or maintain the closure member 118 in sealing engagement with the valve seat 120.

To provide a tight shut-off or a seal between the closure member 118 and the valve seat 120, the closure member 118 engages and aligns (e.g., coaxially aligns) with the valve seat 120 in the closed position. However, any misalignment between the valve seat 120 and the closure member 118 may cause undesired leakage. Variations in the structure or dimensions of the components arising from, for example, an imprecise manufacturing process may cause such a misalignment. Thus, during manufacturing, the closure member 118 and/or the valve seat 120 are typically formed in accordance with precise (e.g., tight) tolerances or a high degree of dimension control, thereby increasing the complexity and cost of the valve 100. For example, if the valve seat 120 and/or the closure member 118 are out-of-round, a seal between the valve seat 120 and the closure member 118 may be compromised making it difficult to achieve an acceptable shut-off. Additionally or alternatively, coupling (e.g., threadably coupling) the valve seat 120 within the valve body 102 may cause the valve seat 120 to deform due to force exerted on the valve seat 120 to retain the valve seat 120 and/or the gasket (e.g., in position) during operation. Additionally, the closure member 118 and the valve seat 120 configuration typically requires a relatively large amount of actuator force or seat load to hold the closure member 118 in sealing engagement with the valve seat 120 to achieve acceptable shut-off levels when the valve 100 is in the closed position.

Additionally or alternatively, many known valve seats such as, for example, the valve seat 120 are configured as seat rings that engage a shoulder 130 of the valve body 102 or other similar surfaces. Such known mating surfaces are not typically capable of compensating for misalignment between a closure member (e.g., the closure member 118) and a sealing surface of a seat ring. For example, a seat ring is typically substantially rigid, which does not allow for thermal expansion of the cage 122 relative to the valve body 102, which may affect the performance (e.g., the seal performance) of the seat ring. For example, a thermal expansion of the cage 122 may cause the seat ring to deform and/or become misaligned relative to the closure member 118, thereby providing an improper seal when the valve 100 is in the closed position.

Figure 2A:
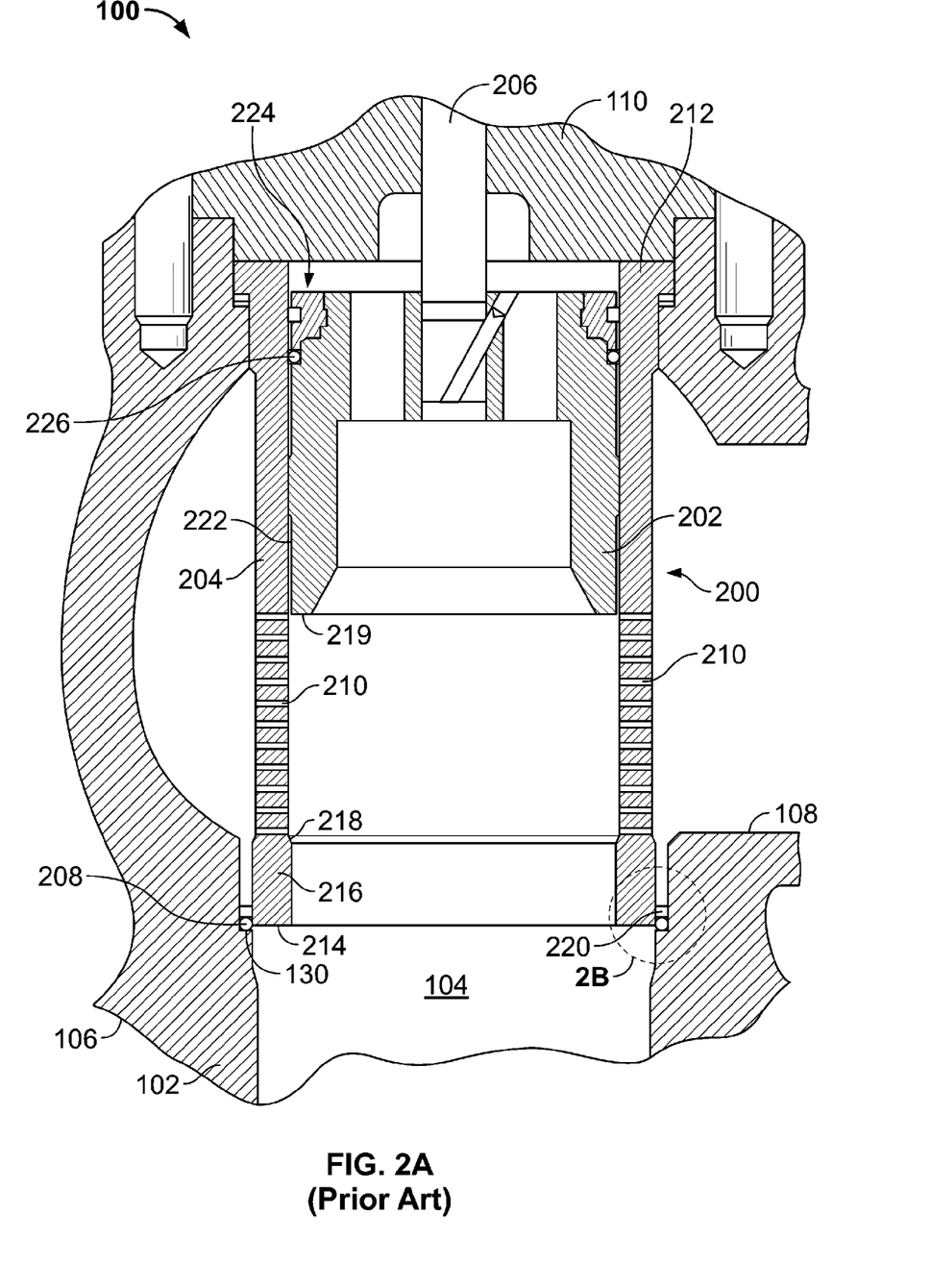
FIG. 2A illustrates a portion of another known fluid valve.
Figure 2B:
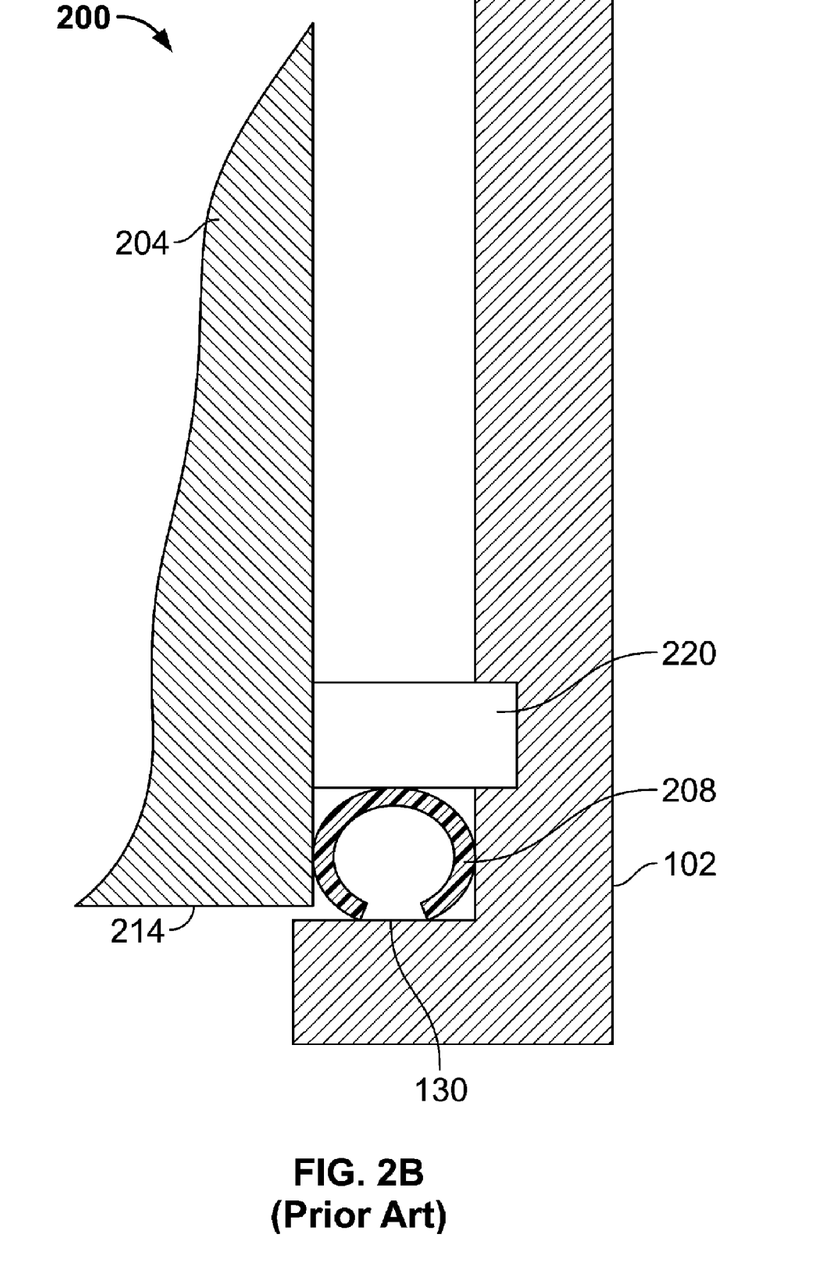
FIG. 2B illustrates an enlarged portion of the known fluid valve of FIG. 2A.

FIG. 2A illustrates an enlarged portion of the fluid valve 100 but implemented with another known valve trim assembly 200. FIG. 2B illustrates an enlarged portion of the known valve trim assembly 200 of FIG. 2A.

Referring to FIGS. 2A and 2B, the known valve trim assembly 200 is disposed within the fluid flow passageway 104 and controls the flow of fluid between the inlet 106 and the outlet 108. In this example, the valve trim assembly 200 includes internal components of the valve 100 such as, for example, a closure member 202, a cage 204, a valve stem 206, and a seal 208. The cage 204 is disposed between the inlet 106 and the outlet 108 to provide certain fluid flow characteristics (i.e., to characterize the fluid flow) via a plurality of openings 210 to reduce noise and/or cavitation generated by the flow of fluid through the valve 100.

A first end 212 of the cage 204 engages the bonnet 110 and a second end 214 of the cage 204 is adjacent but spaced from the shoulder 130 of the valve body 102. In this manner, the cage 204 may expand due to, for example, thermal expansion, without interference from the shoulder 130. Additionally, the cage 204 includes a valve seat portion 216 integrally formed with the cage 204 at the second end 214 of the cage 204. The valve seat portion 216 includes a seating surface 218 to be abuttingly engaged by an end 219 of the closure member 202 when the closure member 202 is in a closed position (e.g., sealingly engaged with the seating surface 218). The seal 208 is disposed between the valve seat portion 216 of the cage 204 and the shoulder 130 of the valve body 102. The seal 208 may be a C-seal and prevents fluid flow between the cage 204 and the valve body 102. The seal 208 is retained or held in position via a retainer ring 220.

As depicted, the closure member 202 (e.g., a valve plug) has an outer surface 222 sized to fit closely within the cage 204 so that the closure member 202 is slidable within the cage 204. Additionally, the closure member 202 may include a seal assembly 224 having a C-seal 226 to provide a seal between the closure member 202 and the cage 204 when the closure member 202 is in the closed position. The valve stem 206 operatively couples the closure member 202 to an actuator stem (not shown) which, in turn, couples the closure member 202 to an actuator (not shown).

In operation, an actuator (e.g., a pneumatic actuator) drives the valve stem 206 and, thus, the closure member 202 between the closed position at which the end 219 of the closure member 202 sealingly and abuttingly engages the seating surface 218 of the valve seat portion 216 to restrict fluid flow through the valve 100 and a fully open or maximum flow rate position at which the end 219 of the closure member 202 is spaced away from the seating surface 218 to allow fluid flow through the valve 100.

Although the example trim assembly 200 does not include a separate valve seat structure (e.g., a seat ring or the valve seat 120 of FIG. 1), the valve seat portion 216 of the cage 204 is often manufactured with tight or close tolerances or a high degree of dimension control. Such precise dimension control enables the closure member 202 to properly align with the seating surface 218 of the valve seat portion 216 when the closure member 202 is in the closed position and tight shut-off levels are desired. However, such tight tolerances or high degree of dimension control significantly increases manufacturing costs. Additionally, although the valve trim assembly 200 may reduce an amount of actuator force or seat load to hold the closure member 202 engaged with the seating surface 218 when the closure member 202 is in the closed position compared to the valve trim assembly 116 of FIG. 1, such a configuration requires a substantially greater amount of seat load to provide a tight shut-off than the example valve seat apparatus described herein.

Figure 3A:
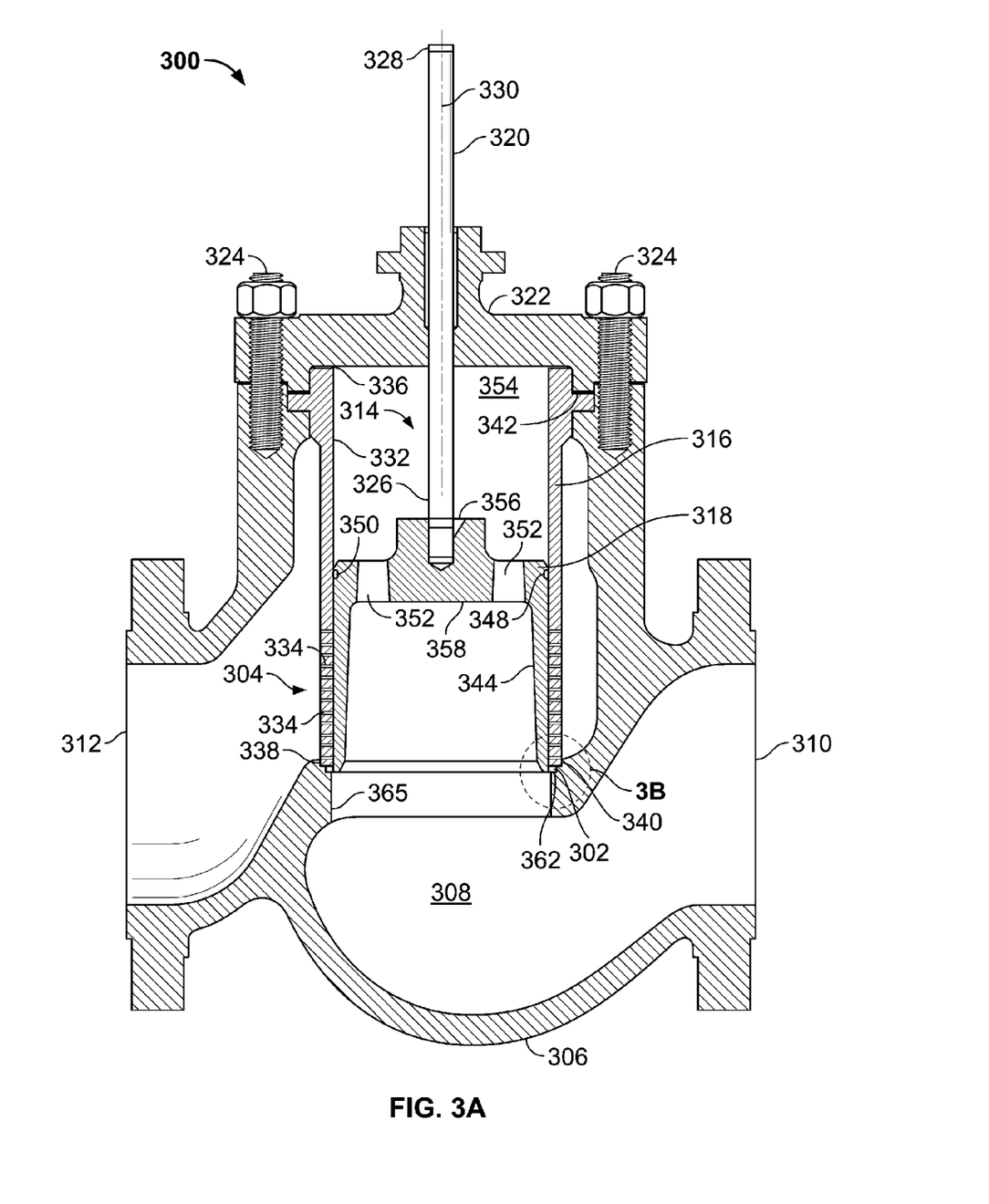
FIG. 3A is a cross-sectional view of a portion of a fluid valve implemented with an example valve seat apparatus described herein and shown in a closed position.
Figure 3B:
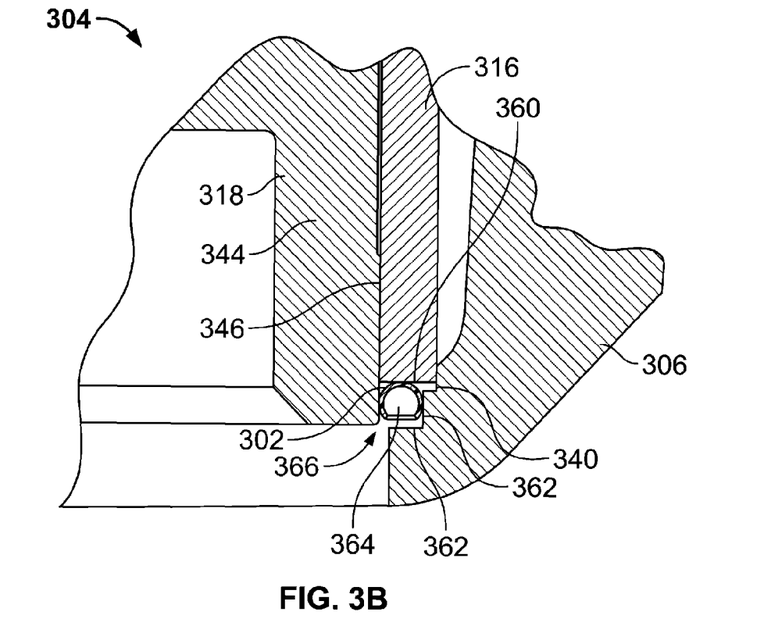
FIG. 3B illustrates an enlarged portion of the example fluid valve of FIG. 3A.
Figure 4A:
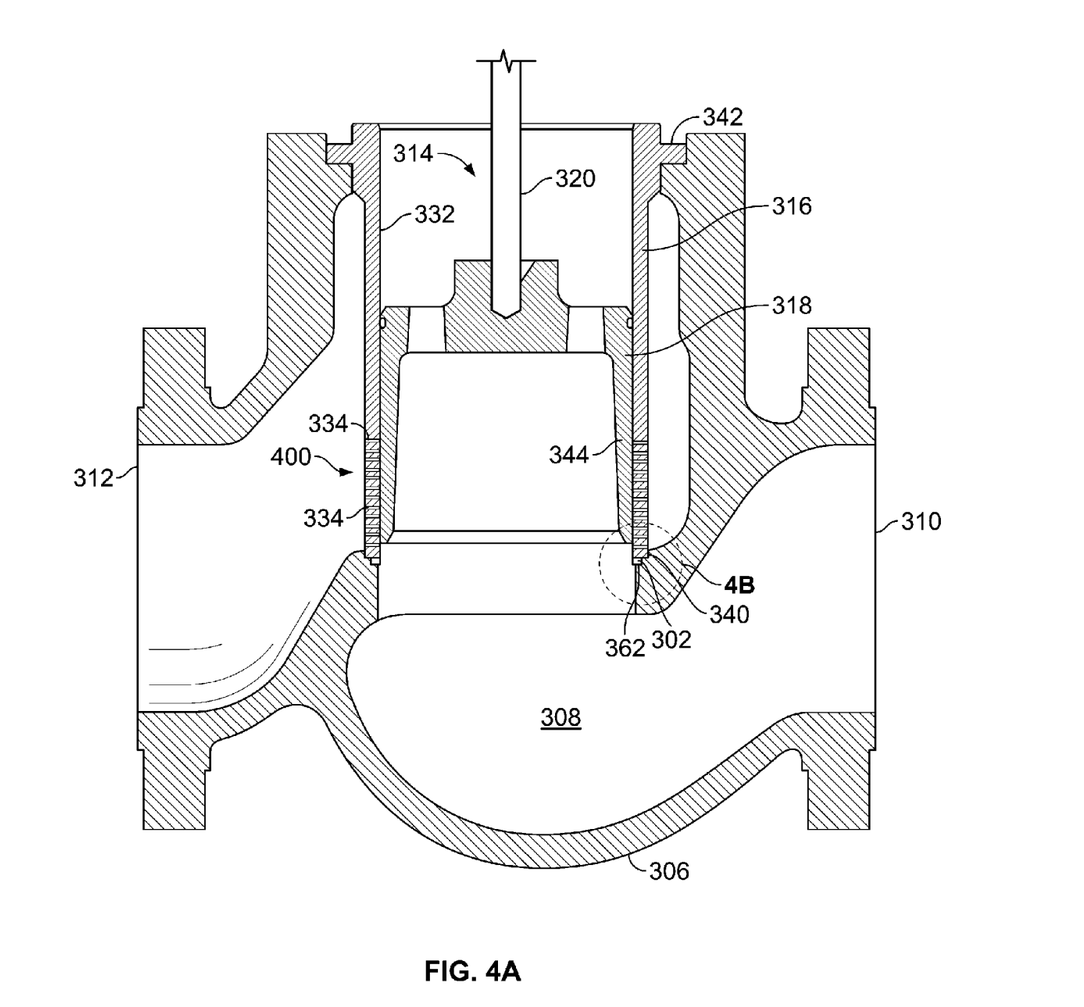
FIG. 4A is a cross-sectional view of the example fluid valve of FIGS. 3A and 3B shown in an open position.
Figure 4B:
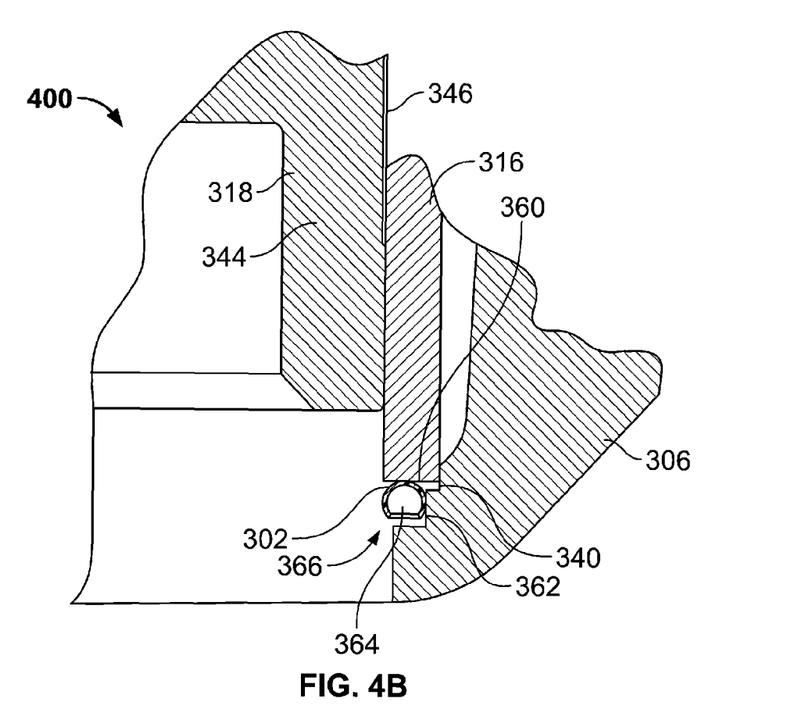
FIG. 4B illustrates an enlarged portion of the example fluid valve of FIG. 4A.

FIGS. 3A, 3B, 4A and 4B illustrate an example valve 300 implemented with an example valve seat apparatus 302 described herein. FIGS. 3A and 3B illustrate the example valve 300 in a closed position 304 and FIGS. 4A and 4B illustrate the example valve 300 in an open position 400.

Referring to FIGS. 3A, 3B, 4A, and 4B, the example valve 300 includes a valve body 306 that defines a passageway 308 between an inlet 310 and an outlet 312. A valve trim assembly 314 interposes in the fluid flow passageway 308 to control the fluid flow between the inlet 310 and the outlet 312. In this example, the valve trim assembly 314 includes a guide structure or cage 316, a closure member 318, the valve seat 302, and a valve stem 320.

A bonnet 322 is coupled to the valve body 306 via fasteners 324, and the bonnet 322 couples the valve body 306 to an actuator (not shown). The valve stem 320 is operatively coupled to the closure member 318 at a first end 326 and extends through the bonnet 322 to couple the closure member 318 to an actuator stem (not shown) at a second end 328. An actuator stem (not shown) couples the closure member 318 to the actuator. Also, although not shown, the bonnet 322 may house a packing system (e.g., a spring packing), which prevents undesired leakage to the environment via the valve stem 320 as the valve stem 320 moves or slides within the valve 300 along an axis 330. A gasket (not shown) may be disposed between the cage 316 and/or the valve body 306 and the bonnet 322 to prevent unwanted fluid leakage through the valve body 306. In this example, the bonnet 322 is fixed to the valve body 306 to retain (e.g., via an interference and/or press fit) the cage 316 within the valve body 306.

The cage 316 (e.g., a hung cage, a split cage, etc.) is disposed between the inlet 310 and the outlet 312 to provide certain fluid flow characteristics (i.e., to characterize the flow of fluid) through the valve body 306. The cage 316 includes a bore 332 to receive (e.g., slidably receive) the closure member 318 and a plurality of openings 334 through which fluid can flow when the valve 300 is in an open position (i.e., when the closure member 318 is spaced away from the valve seat 306). The cage 316 can be configured in different manners to provide certain fluid flow characteristics to suit the needs of a particular control application. For example, the openings 334 may be designed or configured to impart particular, desirable fluid flow characteristics to the fluid such as, for example, to reduce noise and/or cavitation, to enhance pressure reductions of the process fluid, etc. The desired fluid flow characteristics are achieved by varying the geometry of the openings 334.

The cage 316 guides the closure member 318 and provides lateral stability as the closure member 318 travels between the open position 400 and the closed position 304, thereby reducing vibrations and other mechanical stress. The cage 316 can also facilitate maintenance, removal, and/or replacement of the other components of the valve trim assembly 314. In the illustrated example, the cage 316 is a single-piece unitary structure. However, in other examples, the cage 316 may include a two-piece structure having an upper cage portion (e.g., a cage retainer) that may be a solid, non-permeable cylinder or structure that removably couples to a lower cage portion (e.g., a flow control element) that may be a permeable cylinder or structure having at least one opening. In yet other examples, the cage 316 may be coupled to the valve body 306 via threads, fasteners, retainers or any other suitable methods.

In the illustrated example, a first end 336 of the cage 316 engages the bonnet 322 and a second end 338 is adjacent a shoulder or stepped surface 340 of the valve body 306. The first end 336 may include a recessed edge 342 (FIGS. 3A and 4A) to properly align the cage 316 with the valve body 306. As noted above, in this example, the cage 316 is captured (e.g., via a press fit or interference fit) between the bonnet 322 and the valve body 306. However, in other examples, the cage 316 may be threadably coupled to the valve body 306 or coupled to the valve body 306 and/or the bonnet 322 via any other suitable fastening methods.

In the illustrated example, the closure member 318 is depicted as a valve plug having a cylindrical body 344. As most clearly shown in FIGS. 3B and 4B, the body 344 of the closure member 318 provides a sealing or seating surface 346. In this example, the seating surface 346 is a lateral cylindrical face or body 344 of the closure member 318 that is to engage the valve seat 302 when the closure member 318 is in the closed position 304. However, in other examples, the closure member 318 may be a disk or any other structure to vary the flow of fluid through the valve 300.

The body 344 of the closure member 318 is sized to fit closely within the bore 332 of the cage 316 so that the closure member 318 can slide within the bore 332. The closure member 318 can slide within the cage 316 between the closed position 304 (FIGS. 3A and 3B), in which the closure member 318 obstructs the plurality of openings 334 of the cage 316, and the open position 400 (FIGS. 4A and 4B), in which the closure member 318 is clear of (i.e., does not block) at least a portion of the plurality of openings 334. As shown, the body 344 of the closure member 318 includes an annular groove 348 to receive a seal assembly 350 to prevent fluid leakage between the cage 316 and the closure member 318 when the closure member 318 is in the closed position 304.

In this example, the closure member 318 includes channels or conduits 352 to balance the pressures acting across the closure member 318. In this manner, the forces exerted across the closure member 318 by the pressure of the process fluid flowing through the valve 300 are substantially equalized. For example, the pressure of the fluid in a cavity 354 exerts a force on a first side or surface 356 of the closure member 318 that is approximately equal to and opposite a force exerted on a second side or surface 358 of the closure member 318. As a result, a smaller actuating force can be provided to move the closure member 318 between the open position 400 and the closed position 304. Thus, a smaller actuator may be employed to implement the valve 300, thereby reducing costs.

As depicted, the valve seat 302 is disposed between an end 360 of the cage 316 and a shoulder or stepped surface 362 of the valve body 306. In this manner, the cage 316 retains or holds the valve seat 302 during operation. The stepped surface 362 is formed adjacent an orifice 365 of the fluid flow passageway 308. In the illustrated example, the valve seat 302 has a C-shaped cross-sectional shape and may be implemented using a flexible C-seal that can resiliently deform. The C-seal has an open portion 364 that faces an oncoming pressurized fluid flowing through the valve 300. The pressure of the pressurized fluid flowing through the valve 300 pressure-assists the C-seal against a sealing surface 366 (i.e., against the end 360 of the cage 316, the valve body 306, and the sealing surface 346 of the closure member 318). Thus, as the open portion 364 fills with fluid, the pressure of the pressurized fluid causes the C-seal to expand toward the sealing surface 346.

The C-seal may be made of metal, polytetrafluoroethylene (PTFE), or any other suitable material. In other examples, the C-seal may be coated with, for example, a soft metal material, a hard, wear-resistant material, and/or any other suitable materials. In other examples, other seals (e.g., a spring-loaded seal) may be used to provide a seal between the closure member 318 and the valve body 306.

Additionally or alternatively, unlike the valve seat 120 of FIG. 1, the flexible characteristics of the valve seat 302 enables or allows the valve seat 302 to resiliently deform in response to, for example, thermal expansions of the cage 316 relative to the valve body 306 without affecting the performance (e.g., sealing performance) of the valve seat 302 and provides a proper or adequate seal when the valve 300 is in the closed position 304.

In operation, an actuator (e.g., a pneumatic actuator) receives a control fluid (e.g., air) to drive the valve stem 320 and, thus, the closure member 318 between the fully open or maximum flow rate position 400 at which the sealing surface 346 of the closure member 318 is spaced away from the valve seat 302 to allow fluid flow through the valve 300, and the closed position 304 at which the sealing surface 346 of the closure member 318 sealingly engages the valve seat 302 (e.g., the C-seal) to restrict or prevent fluid flow through the passageway 308 of the valve 300.

In the closed position 304, the closure member 318 covers or blocks the openings 334 of the cage 316 and slidingly and sealingly engages the valve seat 302 via the sealing surface 346 to provide a tight seal between the closure member 318 and the valve body 306 and prevent fluid flow between the inlet 310 and the outlet 312. In contrast to the known configurations described in connection with FIGS. 1, 2A and 2B, the closure member 318 is not driven into abutting engagement with another seating surface when the valve 300 is in the closed position. Because the closure member 318 engages the valve seat 302 with its sealing surface 346 (e.g., an outer lateral surface of the body 344), substantially less seat load or force is required to drive and/or hold the closure member 318 in the closed position 304 (e.g., sealingly engaged with the valve seat 302). As a result, a smaller actuator may be employed to implement the valve 300, thereby reducing costs.

Additionally, the example valve seat 302 provides a tight seal or shut-off when sealingly engaged with the closure member 318. For example, the American National Standards Institute has established various leakage classifications (e.g., Class I, II, III, etc.) relating to the amount of fluid flow allowed to pass through a valve when the valve is in a closed position (e.g., the closed position 304). The valve seat 302 can achieve a reliable, tight shut-off, thereby improving the shut-off classification of the valve 300. For example, the example valve seat 302 can provide class V shut-off classification per the American National Standards Institute classification standards.

Figure 5:
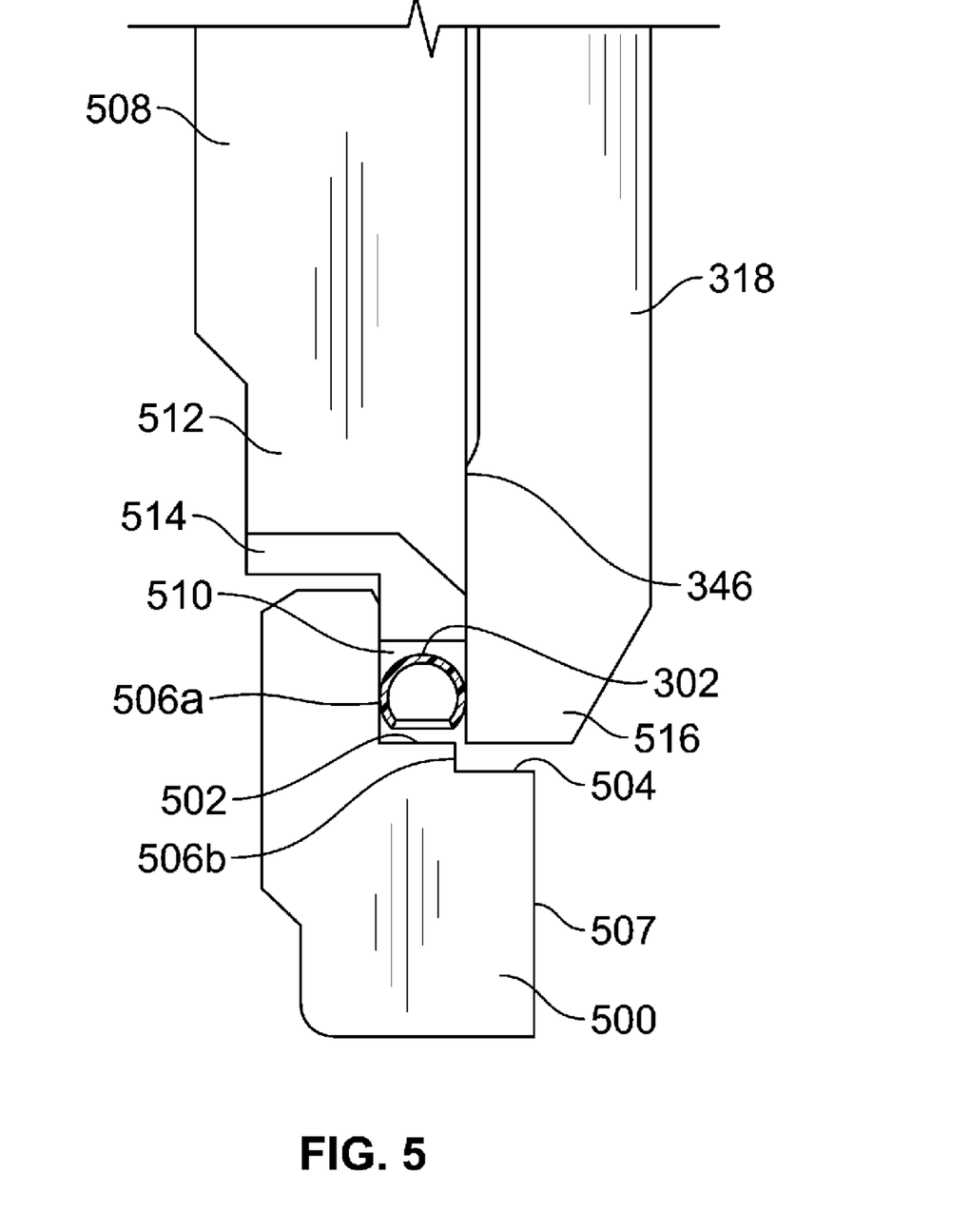
FIG. 5 illustrates another example valve seat apparatus described herein.

FIG. 5 illustrates an alternative valve body 500 implemented with the valve seat 302 of FIGS. 3A, 3B, 4A and 4B. The example valve body 500 includes a first seating surface 502 adjacent a second seating surface 504 formed by stepped surfaces 506a and 506b. The stepped surfaces 506a and 506b are adjacent an orifice 507 of the valve body 500 such that the valve seat 302 can be engaged by the closure member 318 when the closure member 318 is in the closed position. A cage 508 is coupled to the valve body 500 to form a gland 510. As shown, the valve seat 302 is disposed within the gland 510. In the illustrated example, an end 512 of the cage 508 has a recessed or stepped portion 514 to capture or retain (e.g., fix) the valve seat 302 within the gland 510 (i.e., between the end 512 of the cage 508 and the first seating surface 502). In this manner, the valve seat 302 is disposed or fixed substantially away from the fluid flow path (e.g., the fluid passageway 308 of FIGS. 3A and 4A).

In operation, at the closed position, the sealing surface 346 of the closure member 318 slidingly and/or sealingly engages the valve seat 302 and an end 516 of the cage is adjacent the second seating surface 504. However, the closure member 318 is not driven into abutting engagement with another seating surface when the valve 500 is in the closed position. Such a configuration is advantageous when used with process fluids having, for example, high temperatures (e.g., fluid temperatures greater than 600° F.). In other examples, the valve body 500 may include a plurality of stepped surfaces or glands such that the valve seat may be disposed adjacent to or in any one of the plurality of glands.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A valve seat apparatus for use with fluid valves, comprising:
   a seal disposed between a cage and a valve body such that an outer seating surface of a closure member slidably coupled to the cage slidingly engages the seal to prevent fluid flow through the valve body when the valve is in a closed position, the seal being in direct contact with an end of the cage and an inner surface of the valve body, wherein an end of the closure member is not driven toward another seating surface when the valve is in the closed position, and wherein the outer seating surface of the closure member is substantially parallel to a longitudinal axis of the closure member.

2. An apparatus as defined in claim 1, wherein the seal comprises a C-shaped seal.

3. An apparatus as defined in claim 1, wherein the seal comprises a metallic material.

4. An apparatus as defined in claim 1, wherein the seal comprises a flexible seal.

5. An apparatus as defined in claim 1, wherein the seal includes an open portion to be faced toward a pressurized process fluid flowing through the valve body, and wherein the pressure of the process fluid is to pressure-assist the seal against a sealing surface.

6. An apparatus as defined in claim 5, wherein the sealing surface comprises the end of the cage, the inner surface of the valve body and the outer seating surface of the closure member when the valve is in the closed position.

7. An apparatus as defined in claim 1, wherein the valve body comprises a stepped surface to receive the seal.

8. An apparatus as defined in claim 7, wherein the end of the cage retains the seal against the valve body.

9. An apparatus defined in claim 1, wherein the closure member comprises a valve plug having a cylindrical body, and wherein the outer seating surface of the closure member comprises an outer surface of the cylindrical body.

10. An apparatus defined in claim 1, wherein the valve body includes a plurality of stepped surfaces adjacent an orifice of the valve body, and wherein the seal is disposed within any one of the plurality of stepped surfaces.

11. A fluid valve, comprising:
- a valve body defining a fluid flow passageway between an inlet and an outlet and having at least one stepped surface adjacent an orifice of the fluid valve;
- a cage having a first opening to slidably receive at least a portion of a closure member of the fluid valve and a second opening to control the flow characteristics of fluid through the fluid valve; and
- a flexible valve seat disposed between an end of the cage and the stepped surface of the valve body adjacent the orifice, the flexible valve seat being in direct contact with the end of the cage and the stepped surface of the valve body, wherein an outer seating surface of the closure member is to slidably engage the flexible valve seat and the closure member is not driven toward another seating surface when the valve is in a closed position, and wherein the flexible valve seat is to seal against the end of the cage, the stepped surface of the valve body and the outer seating surface of the closure member when the valve is in the closed position to prevent fluid flow between the inlet and the outlet of the valve.

12. A valve as defined in claim 11, wherein the closure member moves between an open position at which the closure member is away from the flexible valve seat to allow fluid flow through the valve, and the closed position at which the closure member sealingly engages the flexible valve seat to prevent fluid flow through the valve.

13. A valve as defined in claim 11, wherein the flexible valve seat comprises a C-seal.

14. A valve as defined in claim 11, wherein the flexible valve seat comprises a flexible material to allow the flexible valve seat to resiliently deform.

15. A valve as defined in claim 11, wherein the outer seating surface of the closure member comprises an outer lateral surface of the closure member.

16. A valve as defined in claim 11, wherein the valve body comprises a second stepped surface adjacent the at least one stepped surface to receive the flexible valve seat, wherein when the flexible valve seat is disposed adjacent the second stepped surface, and wherein the flexible valve seat is spaced away from a process fluid flowing through the passageway of the valve.

17. A valve as defined in claim 11, wherein the seating surface of the closure member is substantially parallel relative to the first opening of the cage.

18. A valve seat apparatus for use with fluid valves, comprising:
- means for sealing an orifice of a valve in direct contact with an end of a guide structure and a stepped surface of a valve body, and wherein an outer surface of a closure member is to slidably engage the means for sealing to prevent fluid flow through the orifice of the valve when the valve is in a closed position, and wherein the closure member is not driven toward another seating surface when the valve is in a closed position, and wherein the means for sealing is to engage the end of the guide structure, the stepped surface of the valve body and the outer surface of the closure member when the valve is in the closed position.

19. A valve as described in claim 18, wherein the means for sealing comprises a valve seat having a C-shaped cross-sectional shape.

20. A valve as described in claim 18, wherein the means for sealing comprises a C-seal.

* * * * *